United States Patent
Kumar et al.

(10) Patent No.: US 12,174,803 B2
(45) Date of Patent: Dec. 24, 2024

(54) SYSTEM AND METHOD FOR DATA WAREHOUSE MIGRATION

(71) Applicant: DATAMETICA SOLUTIONS PRIVATE LIMITED, Pune (IN)

(72) Inventors: Niraj Kumar, Pune (IN); Abbas Gadhia, Pune (IN); Krishnakant Agrawal, Raipur (IN); Stuti Gupta, Ballia (IN)

(73) Assignee: DATAMETICA SOLUTIONS PRIVATE LIMITED (IN)

( * ) Notice: Subject to any disclaimer, the term of this patent is extended or adjusted under 35 U.S.C. 154(b) by 192 days.

(21) Appl. No.: 17/810,852

(22) Filed: Jul. 6, 2022

(65) Prior Publication Data

US 2023/0185781 A1  Jun. 15, 2023

(30) Foreign Application Priority Data

Dec. 9, 2021 (IN) .............................. 202121057314

(51) Int. Cl.
 *G06F 16/21* (2019.01)
 *G06F 16/2453* (2019.01)
 *G06F 16/28* (2019.01)

(52) U.S. Cl.
 CPC ...... *G06F 16/214* (2019.01); *G06F 16/24534* (2019.01); *G06F 16/283* (2019.01)

(58) Field of Classification Search
 CPC ............. G06F 16/214; G06F 16/24534; G06F 16/283; G06F 16/252; G06F 40/56;
 (Continued)

(56) References Cited

U.S. PATENT DOCUMENTS 7,664,795 B2   2/2010   Balin et al.
9,430,505 B2   8/2016   Padmanabhan et al.
(Continued)

FOREIGN PATENT DOCUMENTS

KR    20200080073 A    7/2020

OTHER PUBLICATIONS

Deshpande et al. "Natural Language Query Processing Using Probabilistic Context Free Grammar" International Journal of Advances in Engineering & Technology May 2012 (Year: 2012).*
(Continued)

*Primary Examiner* — Vaishali Shah
*Assistant Examiner* — Berhanu Mitiku
(74) *Attorney, Agent, or Firm* — Jason C. Cameron

(57) ABSTRACT

The system includes a parsing module to receive one or more input constructs from a source database in a first syntactical dialect, parse the one or more input constructs received in the first syntactical dialect using an external domain specific language parser, converts the one or more input constructs upon parsing into an abstract syntax tree corresponding to the first syntactical dialect of the source database. A canonicalization module transforms the abstract syntax tree into a canonical abstract syntax tree by utilizing a library of a plurality of operators and expressions corresponding to the first syntactical dialect. A tree optimization module optimizes the canonical abstract syntax tree by utilizing a set of optimization rules. An input translation module converts the canonical abstract syntax tree into an output code corresponding to a second syntactical dialect associated with a target database for compatibility using a translation layer.

8 Claims, 4 Drawing Sheets

(58) Field of Classification Search
CPC ...... G06F 8/42; G06F 8/427; G06F 16/24526; G06F 16/2282; G06F 16/904; G06F 16/958; G06F 16/24522; G06F 16/90344; G06F 16/2433
See application file for complete search history.

(56) References Cited

U.S. PATENT DOCUMENTS

| | | | |
|---|---|---|---|
| 11,269,824 B1* | 3/2022 | Waas | G06F 16/2448 |
| 2012/0296862 A1 | 11/2012 | Duda et al. | |
| 2017/0103113 A1* | 4/2017 | Greenblatt | G06F 40/143 |
| 2019/0310834 A1* | 10/2019 | Smiljanic | G06F 8/75 |

OTHER PUBLICATIONS

Bais et al. "An independent-domain Natural Language Interface for Relational Database: Case Arabic Language" 2016 IEEE/ACS 13th International Conference of Computer Systems and Applications (AICCSA) Nov. 29, 2016-Dec. 2, 2016 (Year: 2016).*

* cited by examiner

SYSTEM AND METHOD FOR DATA WAREHOUSE MIGRATION

EARLIEST PRIORITY DATE

This International Application claims priority from a complete patent application filed in India having Patent Application No. 202121057314, filed on Dec. 9, 2021 and titled "SYSTEM AND METHOD FOR DATA WAREHOUSE MIGRATION"

BACKGROUND

Embodiments of the present disclosure relate to a system for migrating and analysing applications for moving data and more particularly, to a system and a method for data warehouse migration.

Data integration applications or processes typically utilize specialized computer programs that perform data migration and transformations between data assets like databases, data files and the like. Migrating a data warehouse from one vendor platform to another is useful for several reasons such as database consolidation, company merge or acquisition, cost cutting, data growth and the like. The data migration or modernization from the data warehouses is generally a very complicated, expensive, and time-consuming process, due to migration of complex processes and lengthy workloads. As a result, various systems which are available in the market are utilized to enable data migration from a source location to destination location.

Conventionally, the system available for data migration includes methodologies for migration of extract load and transform workloads or processes of data warehouse technologies such as SQL statements, Stored Procedures, UDF and the like. However, in such a conventional system the technologies which are utilized are written for specific data platforms and follow a particular standard format, and thereby needs to be manually converted to the format associated with a destination data platform. Moreover, such the size and complexity associated with translation of such workloads/processes is very huge and thus requires a lot of manpower which is not only time consuming but also increases cost. Furthermore, the target data platform may also not be equipped with all the features and constructs that the source platform had. Also, there is no documentation which explains the business logic as to why certain steps are written in certain ways for the data migration process. In addition, manual conversion of codes is error prone and does not follow a standard as the process is executed by multiple people differently and thereby compromises accuracy and convenience.

Hence, there is a need for an improved system and a method for data warehouse migration in order to address the aforementioned issues.

BRIEF DESCRIPTION

In accordance with an embodiment of the present disclosure, a system for data warehouse migration is disclosed. The system includes a processing subsystem hosted on a server and configured to execute on a network to control bidirectional communications among a plurality of modules. The processing subsystem includes a parsing module configured to receive one or more input constructs from a source database in a first syntactical dialect. The parsing module is also configured to parse the one or more input constructs received in the first syntactical dialect using an external domain specific language parser. The parsing module is also configured to convert the one or more input constructs upon parsing into an abstract syntax tree corresponding to the first syntactical dialect of the source database by the external domain specific language parser. The processing subsystem also includes a canonicalization module operatively coupled to the parsing module. The canonicalization module is configured to transform the abstract syntax tree into a canonical abstract syntax tree by utilizing a library of a plurality of operators and expressions corresponding to the first syntactical dialect. The processing subsystem also includes a tree optimization module operatively coupled to the canonicalization module. The tree optimization module is configured to optimize the canonical abstract syntax tree by utilizing a set of optimization rules based on a predefined requirement. The processing subsystem also includes an input translation module operatively coupled to the tree optimization module. The input translation module is configured to convert the canonical abstract syntax tree into an output code corresponding to a second syntactical dialect associated with a target database for compatibility using a translation layer.

In accordance with another embodiment of the present disclosure, a method for data warehouse migration is disclosed. The method includes receiving, by a parsing module, one or more input constructs from a source database in a first syntactical dialect. The method also includes parsing, by the parsing module, the one or more input constructs received in the first syntactical dialect using an external domain specific language parser. The method also includes converting, by the parsing module the one or more input constructs upon parsing into an abstract syntax tree corresponding to the first syntactical dialect of the source database by the external domain specific language parser. The method also includes transforming, by a canonicalization module, the abstract syntax tree into a canonical abstract syntax tree by utilizing a library of a plurality of operators and expressions corresponding to the first syntactical dialect. The method also includes optimizing, by a tree optimization module, the canonical abstract syntax tree by utilizing a set of optimization rules based on a predefined requirement. The method also includes converting, by an input translation module, the canonical abstract syntax tree into an output code corresponding to a second syntactical dialect associated with a target database for compatibility using a translation layer.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
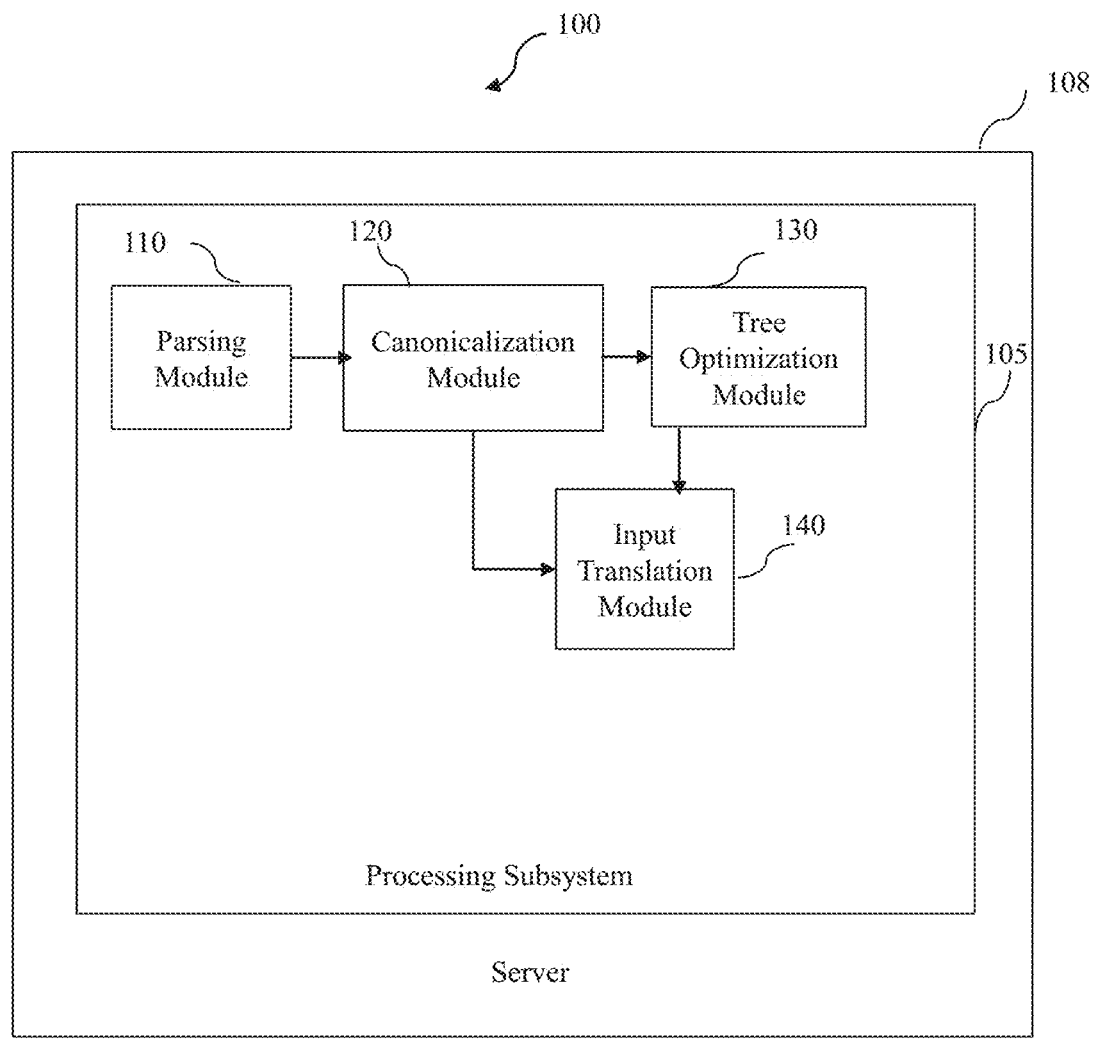
FIG. 1 is a block diagram of a system for data warehouse migration in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for data warehouse migration. The system includes a processing subsystem hosted on a server and configured to execute on a network to control bidirectional communications among a plurality of modules. The processing subsystem includes a parsing module configured to receive one or more input constructs from a source database in a first syntactical dialect. The parsing module is also configured to parse the one or more input constructs received in the first syntactical dialect using an external domain specific language parser. The parsing module is also configured to convert the one or more input constructs upon parsing into an abstract syntax tree corresponding to the first syntactical dialect of the source database by the external domain specific language parser. The processing subsystem also includes a canonicalization module operatively coupled to the parsing module. The canonicalization module is configured to transform the abstract syntax tree into a canonical abstract syntax tree by utilizing a library of a plurality of operators and expressions corresponding to the first syntactical dialect. The processing subsystem also includes a tree optimization module operatively coupled to the canonicalization module. The tree optimization module is configured to optimize the canonical abstract syntax tree by utilizing a set of optimization rules based on a predefined requirement. The processing subsystem also includes an input translation module operatively coupled to the tree optimization module. The input translation module is configured to convert the canonical abstract syntax tree into an output code corresponding to a second syntactical dialect associated with a target database for compatibility using a translation layer.

FIG. 1 is a block diagram of a system 100 for data warehouse migration in accordance with an embodiment of the present disclosure. The system 100 includes a processing subsystem 105 hosted on a server 108. In one embodiment, the server 108 may include a cloud server. In another embodiment, the server 108 may include a local server. The processing subsystem 105 is configured to execute on a network (not shown in FIG. 1) to control bidirectional communications among a plurality of modules. In one embodiment, the network may include a wired network such as local area network (LAN). In another embodiment, the network may include a wireless network such as Wi-Fi, Bluetooth, Zigbee, near field communication (NFC), infrared communication (RFID) or the like.

The processing subsystem 105 includes a parsing module 110 configured to receive one or more input constructs from a source database in a first syntactical dialect. The parsing module 110 is also configured to parse the one or more input constructs received in the first syntactical dialect using an external domain specific language parser. In one embodiment, the one or more input constructs may include at least one of one or more structured query language files with a plurality of structured query language statements, one or more files with a plurality of structured query language statements embedded within one or more programming languages, one or more files with one or more data definition language definitions of a plurality of objects or a combination thereof. In such embodiment, the one or more files with the plurality of structured query language statements embedded within the one or more programming languages includes one or more complete parameterized statements or one or more statements formed by one or more concatenation operations.

In another embodiment, the plurality of objects of the one or more data definition language definitions may include at least one of macros, stored procedures, view definitions, materialized view definitions or a combination thereof. In some embodiment, the first syntactical dialect comprises a structured query language (SQL) dialect corresponding to the source database.

The parsing module 110 is also configured to convert the one or more input constructs upon parsing into an abstract syntax tree corresponding to the first syntactical dialect of the source database by the external domain specific language parser. As used herein, the term 'abstract syntax tree' is defined as a graph representation of source code primarily used by compilers to read code and generate the target binaries. The abstract syntax tree (AST) includes a relational algebra-based tree representation of input source code generated from expressions and operators in a predefined programming language. In one embodiment, the first syntactical dialect comprises a structured query language dialect corresponding to the source database.

The processing subsystem 105 also includes a canonicalization module 120 operatively coupled to the parsing module 110. The canonicalization module 120 is configured to transform the abstract syntax tree into a canonical abstract syntax tree by utilizing a library of a plurality of operators and expressions corresponding to the first syntactical dialect. To create the canonical AST, the canonicalization module visits the SQL parser's AST and maintains a library of sorts of the operators and expressions that can occur in that particular dialect in which source code is written and their equivalent in the canonical form. If no direct equivalent is found the canonicalization module tries to polypill i.e., attain the same end result by a combination of multiple available operators. If that too is not sufficient, then the canonical form is expanded to support that operation. This process ensures that all the operations are made explicit, if the operation is implicit in the source code.

The processing subsystem 105 also includes a tree optimization module 130 operatively coupled to the canonicalization module 120. The tree optimization module 130 is configured to optimize the canonical abstract syntax tree by utilizing a set of optimization rules based on a predefined requirement. The tree optimization module optimizes the canonical AST by passing the canonical AST through optimization layer which identifies common branches involved and further optimizes the query execution plan to execute common logic once to avoid processing cost. Thus, the optimization of the AST helps in reduction of cost when actually executed. In another scenario, other form of optimization of the AST is through query rewriting based on the materialized view. Based on the access pattern of the data, the tree optimization module creates materialized views which enables precomputation of expensive joins and aggregations. The tree optimization module then further does view-based query rewriting which takes an input query written on the base table and answers using a pre-existing materialized view and rewrite the query on the materialized view.

The processing subsystem 105 also includes an input translation module 140 operatively coupled to the tree optimization module 130. The input translation module 140 is configured to convert the canonical abstract syntax tree into an output code corresponding to a second syntactical dialect associated with a target database for compatibility using a translation layer. In a specific embodiment, the input translation module is also configured to convert at least one of a procedural language between proprietary vendor specific formats of the source database and the target database, a structure query language (SQL) present embedded within one or more scripting languages, one or more incomplete structured query language statements present as string variables in the one or more scripting languages, one or more data definition languages between one or more dialects corresponding to the source database and the target database respectively or a combination thereof. In some embodiment, the one or more scripting languages may include bash scripts, shell scripts, python and the like.

In a specific embodiment, the input translation module 140 is configured to perform translation of one or more files with a plurality of structured query language statements embedded within one or more programming languages by reading the one or more files with programming languages linearly for parsing. The input translation module 140 also includes converting one or more programming constructs of the one or more files upon parsing into an abstract syntax tree, wherein each of the abstract syntax tree of each of the one or more files are stitched with other one or more files via a graph data structure. Based on the AST constructed, such AST of the one or more files is utilized to execute the one or more programming constructs and to extract portions of state of variables representing the plurality of structured query language statements for translation. The input translation module also includes splitting a plurality of translated structured query language statements, upon translation, into one or more constituent parts for construction of complete source structured query language and further replacing values of one or more variables holding in the one or more files with the translated structured query language statements-based on a relevant context association.

Again, the input translation module 140 is configured to translate one or more files with one or more data definition language definitions of the plurality of objects by reading the one or more data definition language definitions of the plurality of objects. The input translation module 140 is also configured to read runtime access patterns of one or more related tables for generation of one or more target data definition language definitions for optimization of a target data platform. Further, the input translation module 140 is also configured to translate the one or more data definition language definitions between one or more versions of the data definition languages between one or more dialects corresponding to the target data platform.

Figure 2:
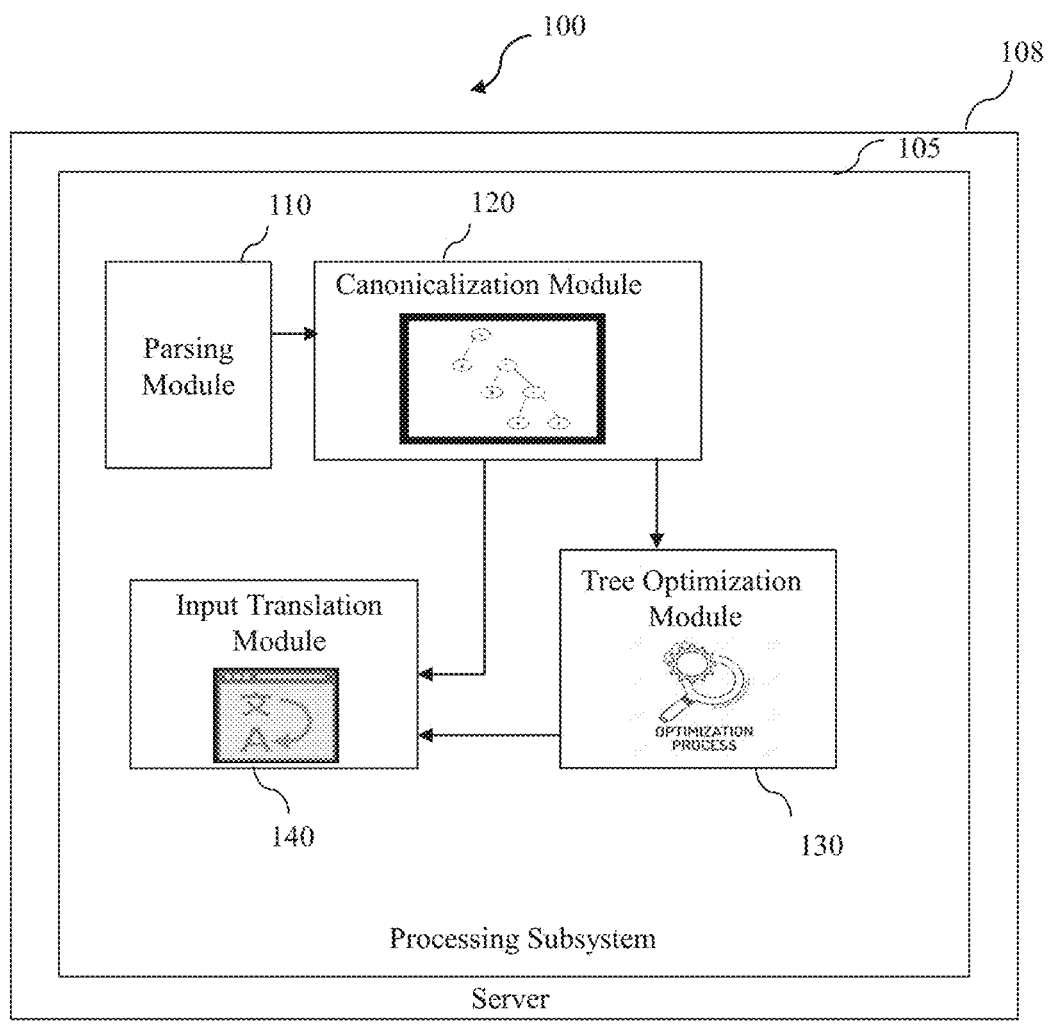
FIG. 2 illustrates a schematic representation of an exemplary embodiment of a system for data warehouse migration of FIG. 1 in accordance with an embodiment of the present disclosure.

FIG. 2 illustrates a schematic representation of an exemplary embodiment of a system 100 for data warehouse migration of FIG. 1 in accordance with an embodiment of the present disclosure. Considering the foregoing description of the features of the system FIG. 1 which depicts a non-limiting example. The system 100 includes a processing subsystem 105 which includes a parsing module 110 configured to receive one or more input constructs from a source database in a first syntactical dialect. In the example used herein, the one or more input constructs may include one or more structured query language (SQL) constructs. In such an example, the one or more input constructs may include at least one of one or more structured query language files with a plurality of structured query language statements, one or more files with a plurality of structured query language statements embedded within one or more programming languages, one or more files with one or more data definition language definitions of a plurality of objects or a combination thereof. Here, the one or more files with the plurality of structured query language statements embedded within the one or more programming languages includes one or more complete parameterized statements or one or more statements formed by one or more concatenation operations.

Again, the plurality of objects of the one or more data definition language definitions may include at least one of macros, stored procedures, view definitions, materialized view definitions or a combination thereof. For example, the first syntactical dialect includes a structured query language (SQL) dialect corresponding to the source database. In the example used herein, lets assume that the first syntactical dialect is standard SQL dialect corresponding to database 'A'.

The parsing module 110 also converts the one or more input constructs upon parsing into an abstract syntax tree (AST) corresponding to the first syntactical dialect of the source database by the external domain specific language parser. Here, the one or more input constructs such as pure SQL files with only SQL statements within them are parsed one by one and broken down into relational algebra of the same. The relational algebra of the SQL statements are represented with one or more operators and expressions in a form of the AST. Once, the AST is constructed, a canonicalization module 120 transforms the abstract syntax tree into a canonical abstract syntax tree by utilizing a library of a plurality of operators and expressions corresponding to the first syntactical dialect. To create the canonical AST, the canonicalization module visits the SQL parser's AST and maintains a library of sorts of the operators and expressions that can occur in that particular dialect in which source code is written and their equivalent in the canonical form. If no direct equivalent is found the canonicalization module tries to polypill i.e., attain the same end result by a combination of multiple available operators. If that too is not sufficient, then the canonical form is expanded to support that operation. This process ensures that all the operations are made explicit, if the operation is implicit in the source code.

Further, in order to modify the tree such that the overall computational cost of the query is reduced, a tree optimization module 130 optimizes the canonical abstract syntax tree by utilizing a set of optimization rules based on a predefined requirement. The tree optimization module optimizes the canonical AST by passing the canonical AST through optimization layer which identifies common branches involved and further optimizes the query execution plan to execute common logic once to avoid processing cost. Thus, the optimization of the AST helps in reduction of cost when actually executed. In another scenario, other form of optimization of the AST is through query rewriting based on the materialized view. Based on the access pattern of the data, the tree optimization module creates materialized views which enables precomputation of expensive joins and aggregations. The tree optimization module then further does view-based query rewriting which takes an input query written on the base table and answers using a pre-existing materialized view and rewrite the query on the materialized view.

Upon optimization, the canonical abstract syntax tree is converted into an output code corresponding to a second syntactical dialect associated with a target database for compatibility by an input translation module 140 using a translation layer. In the example used herein, the second syntactical dialect may include a postgre SQL (PU SQL). Here, the input translation module 140 converts at least one of a procedural language between proprietary vendor specific formats of the source database and the target database, a structure query language (SQL) present embedded within one or more scripting languages such as Python, Shell scripts, one or more incomplete structured query language statements present as string variables in the one or more scripting languages, one or more data definition languages between one or more dialects corresponding to the source database and the target database respectively or a combination thereof. The translation layer also handles one or more syntactical differences which are observed generally in case of data migration. Thus, the input translation module converts the canonical AST to string output which is in the syntax of the target database by emulating the source data platform behaviour with the features and constructs of the target database platform in an accurate, timesaving and a cost-effective way.

Figure 3:
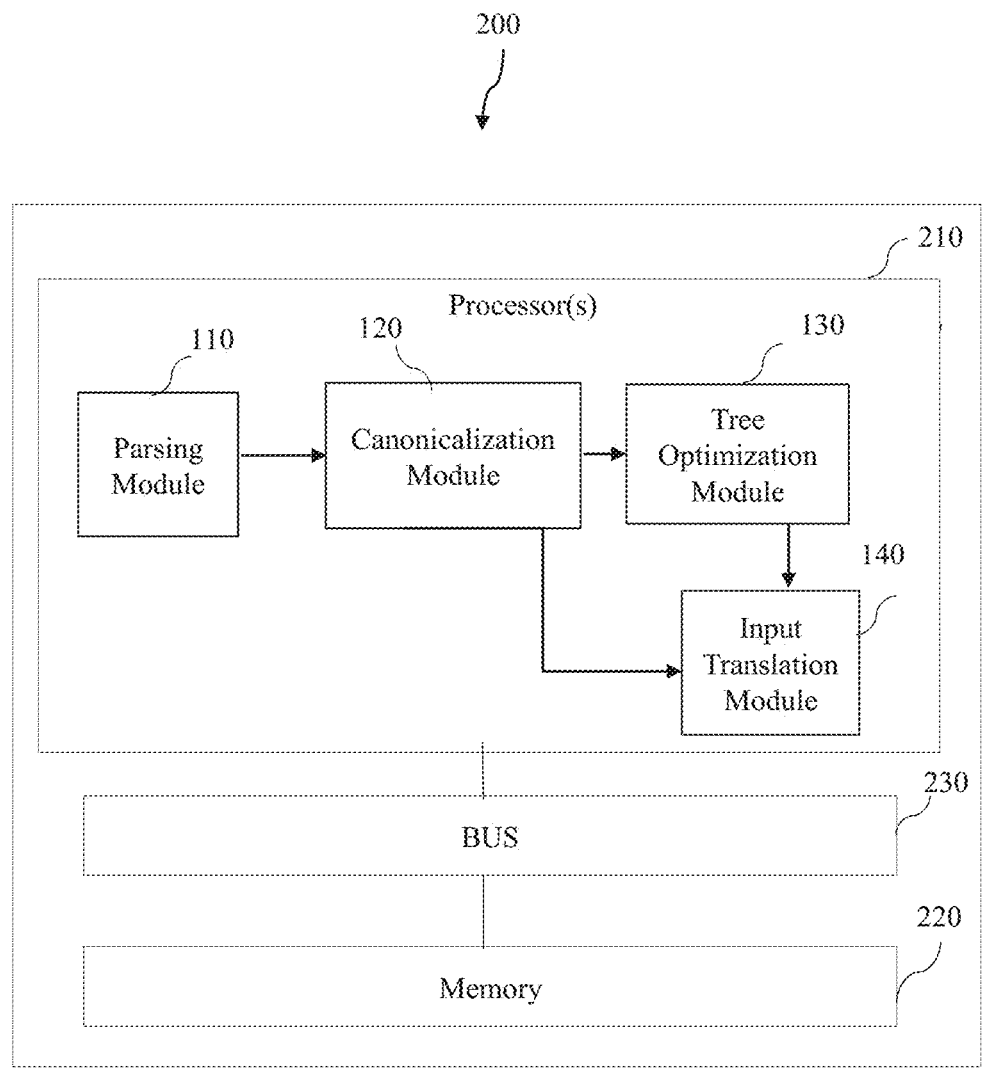
FIG. 3 is a block diagram of a computer or a server in accordance with an embodiment of the present disclosure.

FIG. 3 is a block diagram of a computer or a server in accordance with an embodiment of the present disclosure. The server 200 includes processors 230, and memory 210 operatively coupled to the bus 220. The processors 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes several subsystems stored in the form of an executable program which instructs the processor 230 to perform the method steps illustrated in FIG. 1. The memory 210 includes a processing subsystem 105 of FIG. 1. The processing subsystem 105 further has following modules: a parsing module 110, a canonicalization module 120, a tree optimization module 130 and an input translation module 140.

The parsing module 110 is configured to receive one or more input constructs from a source database in a first syntactical dialect. The parsing module 110 is also configured to parse the one or more input constructs received in the first syntactical dialect using an external domain specific language parser. The parsing module 110 is also configured to convert the one or more input constructs upon parsing into an abstract syntax tree corresponding to the first syntactical dialect of the source database by the external domain specific language parser. The canonicalization module 120 is configured to transform the abstract syntax tree into a canonical abstract syntax tree by utilizing a library of a plurality of operators and expressions corresponding to the first syntactical dialect. The tree optimization module 130 is configured to optimize the canonical abstract syntax tree by utilizing a set of optimization rules based on a predefined requirement. The input translation module 140 is configured to convert the canonical abstract syntax tree into an output code corresponding to a second syntactical dialect associated with a target database for compatibility using a translation layer.

The bus 220 as used herein refers to be internal memory channels or computer network that is used to connect computer components and transfer data between them. The bus 220 includes a serial bus or a parallel bus, wherein the serial bus transmits data in bit-serial format and the parallel bus transmits data across multiple wires. The bus 220 as used herein, may include but not limited to, a system bus, an internal bus, an external bus, an expansion bus, a frontside bus, a backside bus and the like.

Figure 4:
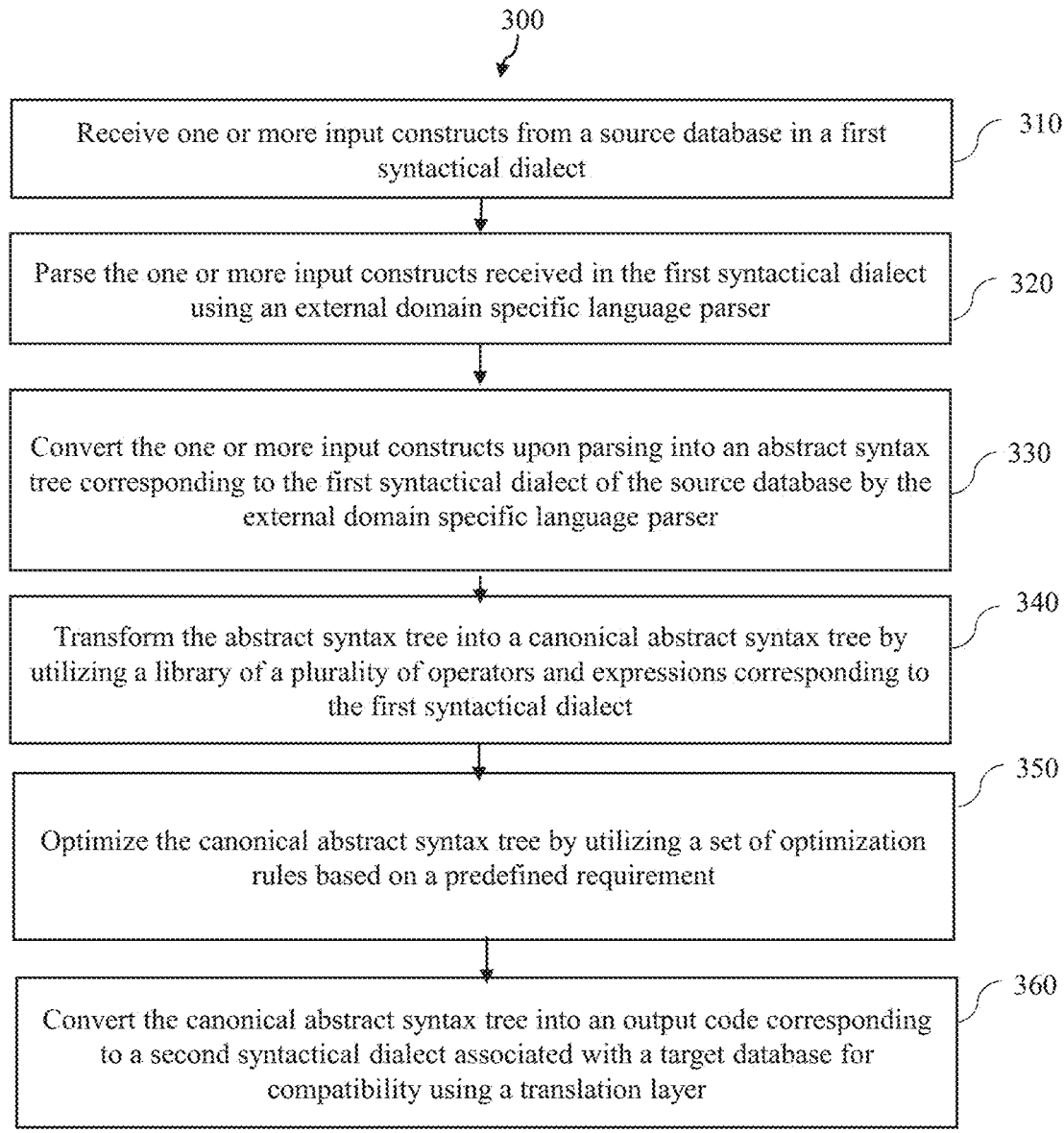
FIG. 4 is a flow chart representing the steps involved in a method for data warehouse migration of FIG. 1 in accordance with the embodiment of the present disclosure.

FIG. 4 is a flow chart representing the steps involved in a method 300 for data warehouse migration of FIG. 1 in accordance with the embodiment of the present disclosure. The method 300 includes receiving, by a parsing module, one or more input constructs from a source database in a first syntactical dialect in step 310. In one embodiment, receiving the one or more input constructs from the source database may include receiving the one or more input constructs may include at least one of one or more structured query language files with a plurality of structured query language statements, one or more files with a plurality of structured query language statements embedded within one or more programming languages, one or more files with one or more data definition language definitions of a plurality of objects or a combination thereof. In such embodiment, the one or more files with the plurality of structured query language statements embedded within the one or more programming languages includes one or more complete parameterized statements or one or more statements formed by one or more concatenation operations.

The method 300 also includes parsing, by the parsing module, the one or more input constructs received in the first syntactical dialect using an external domain specific language parser in step 320. In one embodiment, parsing the one or more input constructs received in the first syntactical dialect may include receiving the one or more input constructs in a structured query language (SQL) dialect corresponding to the source database. The method 300 also includes converting, by the parsing module the one or more input constructs upon parsing into an abstract syntax tree corresponding to the first syntactical dialect of the source database by the external domain specific language parser in step 330.

The method 300 also includes transforming, by a canonicalization module, the abstract syntax tree into a canonical abstract syntax tree by utilizing a library of a plurality of operators and expressions corresponding to the first syntactical dialect in step 340. In one embodiment, transforming the abstract syntax tree into the canonical abstract tree may include transforming a relational algebra-based tree representation of input source code generated from expressions and operators in a predefined programming language.

The method 300 also includes optimizing, by a tree optimization module, the canonical abstract syntax tree by utilizing a set of optimization rules based on a predefined requirement in step 350. The method 300 also includes converting, by an input translation module, the canonical abstract syntax tree into an output code corresponding to a second syntactical dialect associated with a target database for compatibility using a translation layer in step 360.

Various embodiments of the present disclosure provides a system which enables automatic conversion of SQL constructs/objects for unsupported or deficient SQL clauses in the target SQL-like language and thereby helps in optimized SQL conversion between 2 SQL-like languages.

Moreover, the present disclosed system provides support for unsupported compatible functions through polyfills and also makes all the implicit assumptions of source dialect explicit in target dialect. Furthermore, the present disclosed system provides translation support for DB specific utilities like load-store utility, macros, stored procedures and the like.

In addition, the present disclosed system aims to automate this manual process of data warehouse migration from a source location to a destination location which not only increases convenience and accuracy while reducing time and cost at the same point of time.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for data warehouse migration, comprising:
a processor; and
a memory coupled to the processor, wherein the memory comprises a set of program instructions in the form of a processing subsystem, configured to be executed by the processor, wherein a processing subsystem hosted on a server, and configured to execute on a network to control bidirectional communications among a plurality of modules comprising:
a parsing module configured to:
receive one or more input constructs from a source database in a first syntactical dialect, wherein the first syntactical dialect comprises a structured query language dialect corresponding to the source database;
parse the one or more input constructs received in the first syntactical dialect using an external domain specific language parser; and
convert the one or more input constructs, upon parsing, into an abstract syntax tree corresponding to the first syntactical dialect of the source database by the external domain specific language parser, wherein the abstract syntax tree comprises a relational algebra-based tree representation of input source code generated from expressions and operators in a predefined programming language;
a canonicalization module operatively coupled to the parsing module, wherein the canonicalization module is configured to transform the abstract syntax tree into a canonical abstract syntax tree by utilizing a library of a plurality of operators and expressions corresponding to the first syntactical dialect;
a tree optimization module operatively coupled to the canonicalization module, wherein the tree optimization module is configured to optimize the canonical abstract syntax tree by utilizing a set of optimization rules based on a predefined requirement; and
an input translation module operatively coupled to the tree optimization module, wherein the input translation module is configured to convert the canonical abstract syntax tree into an output code corresponding to a second syntactical dialect associated with a target database for compatibility using a translation layer.

2. The system as claimed in claim 1, wherein the one or more input constructs comprises at least one of one or more structured query language files with a plurality of structured query language statements, one or more files with a plurality of structured query language statements embedded within one or more programming languages, one or more files with one or more data definition language definitions of a plurality of objects or a combination thereof.

3. The system as claimed in claim 2, wherein the one or more files with the plurality of structured query language statements embedded within the one or more programming languages comprises one or more complete parameterized statements or one or more statements formed by one or more concatenation operations.

4. The system as claimed in claim 2, wherein the plurality of objects of the one or more data definition language definitions comprises at least one of macros, stored procedures, view definitions, materialized view definitions or a combination thereof.

5. The system as claimed in claim 1, wherein the input translation module is configured to perform translation of one or more files with a plurality of structured query language statements embedded within one or more programming languages by:
   reading the one or more files with programming languages linearly for parsing;
   converting one or more programming constructs of the one or more files upon parsing into an abstract syntax tree, wherein each of the abstract syntax tree of each of the one or more files are stitched with other one or more files via a graph data structure;
   utilizing the abstract syntax tree of the one or more files to execute the one or more programming constructs and to extract portions of state of variables representing the plurality of structured query language statements for translation;
   splitting a plurality of translated structured query language statements, upon translation, into one or more constituent parts for construction of complete source structured query language; and
   replacing values of one or more variables holding in the one or more files with the translated structured query language statements-based on a relevant context association.

6. The system as claimed in claim 1, wherein the input translation module is configured to translate one or more files with one or more data definition language definitions of a plurality of objects by:
   reading the one or more data definition language definitions of the plurality of objects;
   reading runtime access patterns of one or more related tables for generation of one or more target data definition language definitions for optimization of a target data platform; and
   translating the one or more data definition language definitions between one or more versions of the data definition languages between one or more dialects corresponding to the target data platform.

7. The system as claimed in claim 1, wherein the input translation module is configured to convert at least one of a procedural language between proprietary vendor specific formats of the source database and the target database, a structure query language present embedded within one or more scripting languages, one or more incomplete structured query language statements present as string variables in the one or more scripting languages, one or more data definition languages between one or more dialects corresponding to the source database and the target database respectively or a combination thereof.

8. A method for data warehouse migration, comprising:
   a parsing module configured for:
      receiving one or more input constructs from a source database in a first syntactical dialect, wherein the first syntactical dialect comprises a structured query language dialect corresponding to the source database;
      parsing the one or more input constructs received in the first syntactical dialect using an external domain specific language parser;
      converting the one or more input constructs, upon parsing, into an abstract syntax tree corresponding to the first syntactical dialect of the source database by the external domain specific language parser, wherein the abstract syntax tree comprises a relational algebra-based tree representation of input source code generated from expressions and operators in a predefined programming language;
      transforming the abstract syntax tree into a canonical abstract syntax tree by utilizing a library of a plurality of operators and expressions corresponding to the first syntactical dialect;
      optimizing the canonical abstract syntax tree by utilizing a set of optimization rules based on a predefined requirement; and
      converting the canonical abstract syntax tree into an output code corresponding to a second syntactical dialect associated with a target database for compatibility using a translation layer.

* * * * *